(12) United States Patent
Dawley, III

(10) Patent No.: US 8,621,969 B2
(45) Date of Patent: Jan. 7, 2014

(54) WORKPIECE STOP AND ASSOCIATED SECURING MEMBER

(76) Inventor: James A. Dawley, III, Waterloo, NY (US)

(*) Notice: Subject to any disclaimer, the term of this patent is extended or adjusted under 35 U.S.C. 154(b) by 1659 days.

(21) Appl. No.: 11/737,320

(22) Filed: Apr. 19, 2007

(65) Prior Publication Data

US 2007/0251366 A1  Nov. 1, 2007

Related U.S. Application Data

(60) Provisional application No. 60/745,951, filed on Apr. 28, 2006, provisional application No. 60/806,729, filed on Jul. 7, 2006.

(51) Int. Cl.
*B26D 7/02* (2006.01)

(52) U.S. Cl.
USPC .................. 83/462; 83/465; 83/448; 83/466; 83/522.25

(58) Field of Classification Search
USPC .............. 83/522.25, 522.19, 448, 468.2, 466, 83/468.7, 435.19, 435.13, 435.12, 435.15, 83/462, 465; 144/253.6, 253.5, 253.91, 144/253.4, 253.8
See application file for complete search history.

(56) References Cited

U.S. PATENT DOCUMENTS

| | | | | |
|---|---|---|---|---|
| 1,002,980 A * | 9/1911 | Fish | | 83/767 |
| 1,299,367 A * | 4/1919 | McMichael et al. | | 83/435.14 |
| 2,048,629 A * | 7/1936 | Wallin | | 269/55 |
| 2,759,503 A * | 8/1956 | Goldschmidt | | 83/707 |
| 2,773,299 A * | 12/1956 | Mack | | 83/412 |
| 2,785,709 A * | 3/1957 | Shepp | | 83/435.14 |
| 2,884,965 A * | 5/1959 | Stahl | | 33/640 |
| 2,998,813 A * | 9/1961 | Wilson | | 125/13.03 |
| 3,344,819 A * | 10/1967 | Mitchell | | 83/471.3 |
| 3,872,760 A * | 3/1975 | Desnoyers, Jr. | | 83/743 |
| 4,193,331 A * | 3/1980 | Gathings | | 83/468 |
| 4,259,887 A * | 4/1981 | Dean | | 83/435.14 |
| 4,283,977 A | 8/1981 | Batson | | |
| 4,871,156 A * | 10/1989 | Kozyrski et al. | | 269/303 |
| 5,042,346 A * | 8/1991 | McCann | | 83/421 |
| 5,615,665 A * | 4/1997 | Thiriet | | 125/23.02 |
| 5,774,998 A * | 7/1998 | Mortensen | | 33/529 |
| 5,845,555 A | 12/1998 | Dawley | | |
| 6,139,000 A * | 10/2000 | Price et al. | | 269/71 |
| 6,422,115 B1 | 7/2002 | Shibata | | |
| 6,557,601 B1 | 5/2003 | Taylor | | |
| 6,899,006 B2 | 5/2005 | Jolkovski | | |
| 6,932,074 B2 * | 8/2005 | Cheng et al. | | 125/13.01 |
| 2006/0101971 A1 | 5/2006 | Roe | | |

* cited by examiner

*Primary Examiner* — Omar Flores Sanchez
(74) *Attorney, Agent, or Firm* — Duane C. Basch; Basch & Nickerson LLP

(57) ABSTRACT

An integrated mechanical stop and securing apparatus for the safe positioning and securing of a short cut-off workpiece in close proximity to a cutting tool during a cutting operation. The mechanical stop is attached to a fence, work surface or similar structure using a moveable clamp. The workpiece stop further includes a pivotally attached securing member that abuts a surface of a workpiece during a cutting operation involving a relatively short cut-off. Biasing force for the securing member is provided by an operator grasping a handle on the securing member. Increased safety is provided when the stop device maintains the operator's hands outside of the effective cutting area of the power tool, while providing an accurate and reliable stop to index the cut.

12 Claims, 6 Drawing Sheets

US 8,621,969 B2

WORKPIECE STOP AND ASSOCIATED SECURING MEMBER

PRIORITY INFORMATION

This application claims priority from U.S. Provisional Application No. 60/745,951, filed Apr. 28, 2006, and U.S. Provisional Application No. 60/806,729, filed on Jul. 7, 2006, both by James A. Dawley, the entire contents of both applications being hereby incorporated by reference.

CROSS-REFERENCE TO RELATED PATENT

Cross-reference is made to issued U.S. Pat. No. 5,845,555 for a "MULTI-POSITION ADJUSTABLE WORK STOP ASSEMBLY," by James A. Dawley, issued Dec. 8, 1998, which is also hereby incorporated by reference in its entirety.

FIELD OF THE INVENTION

This invention relates generally to a workpiece cut-off stop for the purpose of cutting a repeatable length, in combination with a workpiece securing device, and more particularly to an apparatus which attaches to an extended work surface of a power saw or similar cutting machine to accurately index the length of a relatively short workpiece and then securing the workpiece in place while cutting, thereby reducing the risk of injury to the operator.

BACKGROUND AND SUMMARY

Power miter saws are routinely found in woodworking environments for use in various cutting applications, such as bias cutting of long, but narrow stock. Over the past several years, the use of the miter saw has expanded significantly due largely to versatility, accuracy, cost and simplicity of use. Today, miter saws are commonly found in commercial wood working shops, home shops and even in retail outlets in the place of radial arm and table saws.

A typical power miter saw includes a relatively compact horizontal flat top work surface measuring about two feet in length having a vertically projecting backstop, commonly referred to as a fence. The material to be cut, such as a wood, plastic, metal, ceramic, masonry or similar materials is horizontally supported by the work surface and vertically aligned along the fence. A rotary blade and associated motor are pivotally mounted to, and above, the work surface to plunge cut into a stationary workpiece and thereby accurately forming a cut to separate the workpiece at a specified dimension. Some miter saws are referred to as "sliding miter saws" because they are pulled to the front of the work table in the raised position, lowered, and then pushed towards the fence while cutting through the workpiece.

While the power miter saw, also referred to as a "chop" saw, is an efficient and proven power cutting tool, there remain a number of shortcomings associated with the operation thereof. One such problem with the miter saw operation relates to the precise and repeatable measuring of the cut length, specifically as it relates to a relatively short workpiece. Previously, a table saw was utilized wherein a movable rip fence and/or miter guide would position the workpiece based on a pre-determined dimension. While this problem has been widely recognized for many years by the users, miter saw manufactures have failed to develop an effective measuring and securing means for use with these saws, especially when a short piece length is required.

Miter saws are designed and manufactured according to the American National Standards Institute (ANSI) and Underwriter's Laboratories Inc. (UL) standards contained in ANSI/UL 987, Stationary and Fixed Electric Tools. Miter saws are required by this standard to have the necessary blade guards to mitigate the potential for hand and finger injuries. Despite these standards there remains an ongoing risk of serious injury inherent with conventional miter saw designs. In 2005 alone the US Product Safety Commission reported 29,779 miter saw injuries requiring a trip to a hospital emergency room. (NIESS code 832 & 895)

In response to the problem associated with accurately controlling the cut length of a workpiece, U.S. Pat. No. 5,845,555, MULTI-POSITION ADJUSTABLE WORK STOP ASSEMBLY, was issued to Dawley the inventor to the present application. Other solutions are suggested in U.S. Pat. No. 6,899,006 issued to Jolkovski and in U.S. Pat. No. 6,557,601 issued to Taylor, where a linear scale provides a reference stop for a substantially long workpiece. However, in all of the noted patents, the fence and motor, as well as the associated blade guard, potentially interfere when short pieces are to be safely cut.

Therefore, a serious problem remains with the use of miter saws in relation to operator safety—particularly when executing a cut on a relatively short piece. The potential for injury is further increased when angled or miter cuts are being made on short pieces. More particularly, during normal use the rotating saw blade often comes in close proximity to the operator's hands and fingers as the rotating blade plunges down into the workpiece. As a result individuals have been seriously injured by inadvertent contact with the saw blade while operating the miter saw. When cutting relatively short pieces the risk of injury is increased since the operator is now required to position and support a workpiece against the fence in close proximity to the blade while cutting. If the cut-off piece is not held in some manner there is also the risk of the piece becoming a projectile once the cut is completed.

Several devices are intended to protect operators from injury while operating miter saws, including blade guards and electric brakes, which serve to limit hand contact with the rotating blade. Blade guards and brakes, however, have proven ineffective because the blade becomes exposed when cutting and moving at up to 8,000 RPM (275 MPH) while the operator is attempting to secure the workpiece within inches of the blade. Other attempts to improve safety features include providing a workpiece securing member designed to assist the operator in mechanically mounting the work in a "hands free" manner. U.S. Pat. No. 4,283,977, issued to Baton, and U.S. Pat. No. 6,422,115, issued to Shibata, disclose mechanisms adapted for clamping the workpiece during the sawing process, so as to keep the operator's hands free from the danger area of the saw. These devices, however, are adapted for securing a relatively long workpiece within the cutting area, and are generally not usable when a relatively short cut-off is required.

Again, the blade guard and motor interfere with a securing device, which limits the clamp's proximity to the blade, especially since a miter saw is capable of rotating at least +/−45 degree about the axis perpendicular to a work surface. As discussed above, this limits the applicability of such clamps for use with smaller workpieces, which must be secured much closer to the saw blade path. Hence, a need exists for improvements directed to protecting operators from injury by securing a relatively short workpiece during the cutting operation.

Further, as noted above, a need also exists for a securing mechanism that is capable of adequately controlling and indexing the cut-off length in order to provide greater accuracy, but more importantly to provide adequate safety for an operator.

In accordance with the present invention there is provided a safety apparatus for securely holding a workpiece, comprising: a work surface; and a securing member operable in cooperation with, and pivotally attached to, said work surface, said securing member securing the workpiece while operated on by a cutting tool.

In accordance with one aspect of the invention, there is provided A workpiece stop and securing apparatus for positioning and securely holding a workpiece in relation to a saw blade, comprising: an adjustable mount movably attached to a fence, said adjustable mount including a stop member attached thereto in order to control a distance between the saw blade and the stop member; and a workpiece securing member pivotally attached to said adjustable mount, in a plane generally parallel to a work surface, to apply a holding force to a surface of the workpiece.

In accordance with yet another aspect of the invention, there is disclosed a method for cutting a short piece from a workpiece, comprising: attaching an adjustable mount to a work surface of a power tool; pivotally attaching a workpiece stop, including a securing member, to the mount; setting and locking the mount to position to provide a workpiece stop at a defined distance from a cutting tool; abutting an end of the workpiece to the stop member; applying a force against a surface of the workpiece with the pivotally attached securing member; energizing the power tool; and engaging the cutting portion of the power tool at the specified workpiece cut-off length, while continuing to grasp the workpiece with the securing member in a securing orientation.

These and other advantages and features, which characterize the invention, are pointed out with particularity in the drawings as described within the following embodiments of the invention.

Figure 1:
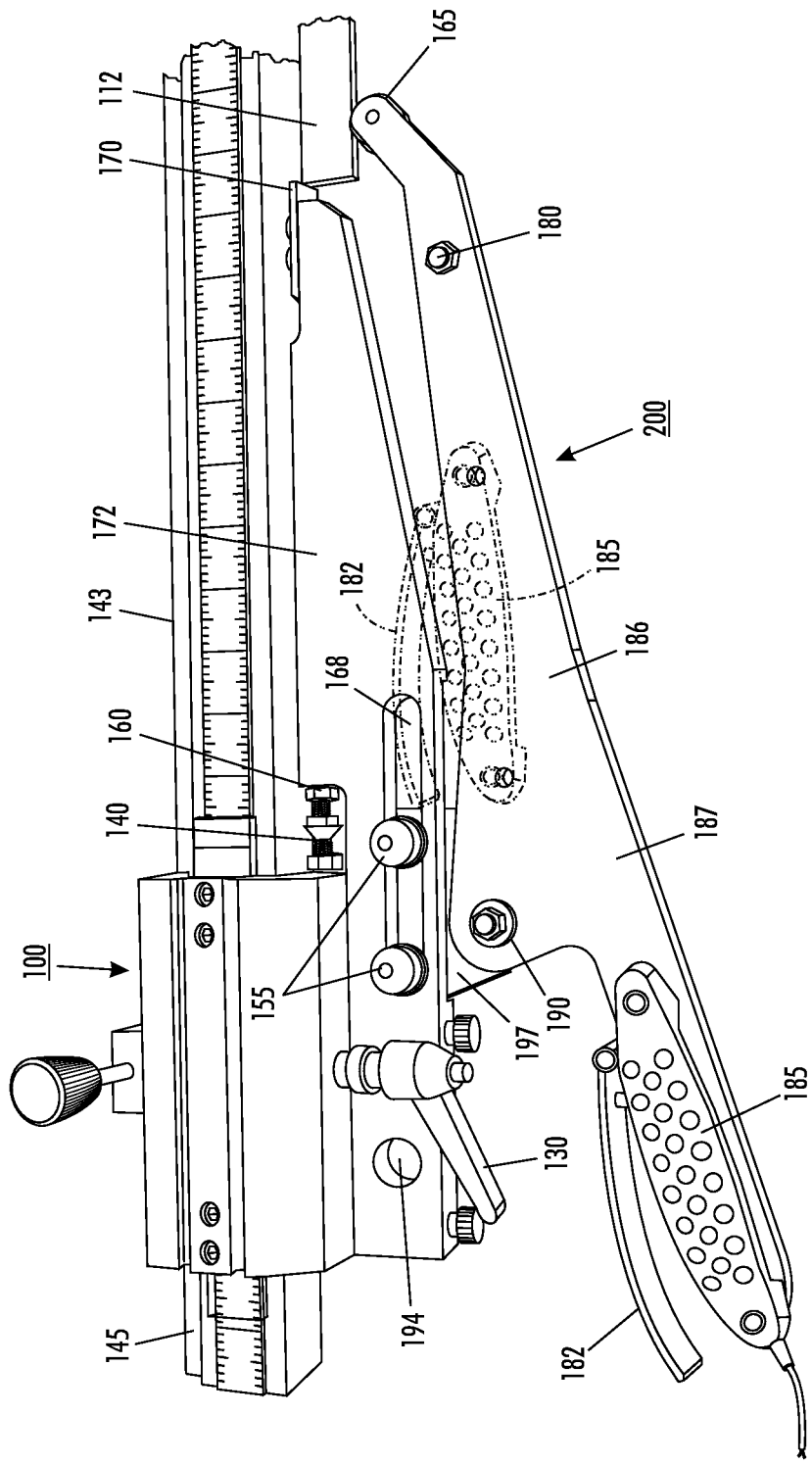
FIG. 1 is a perspective view of the securing and stop apparatus.

The present invention will be described in connection with various embodiments, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements.

In accordance with the disclosed embodiments a safety device is provided to assist an operator in locating and securing short pieces of material, or stock (referred to as "workpieces"), while the workpiece is operated upon by a power miter saw, or alternatively other power tools such as radial arm, table, and ceramic tile saws, and possibly drill presses or similar material cutting, shaping and forming tools. Accordingly, it is an object of the present invention to provide a novel and improved accessory (e.g., for a miter saw) that will maximize the safety to the operator while still providing accurate positioning for a relatively short workpiece.

Figure 6:
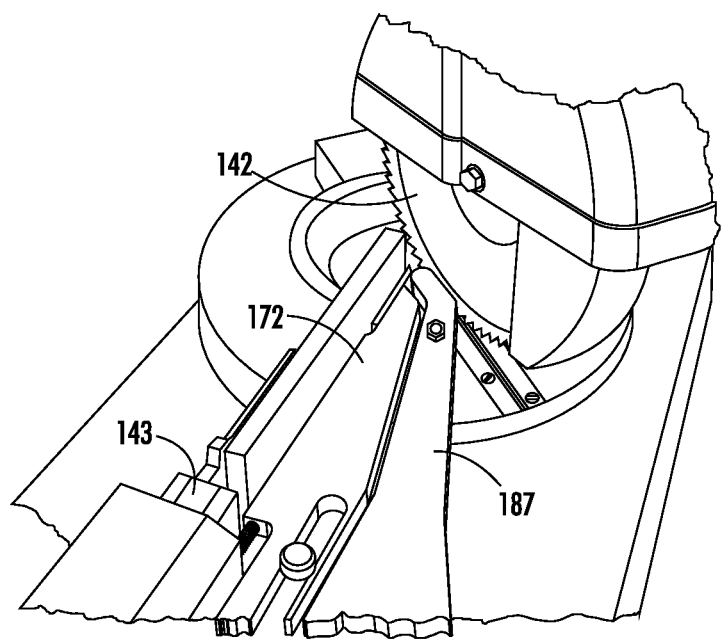
FIG. 6 is a first perspective view of the work table in use with a miter saw in a first cutting position.
Figure 7:
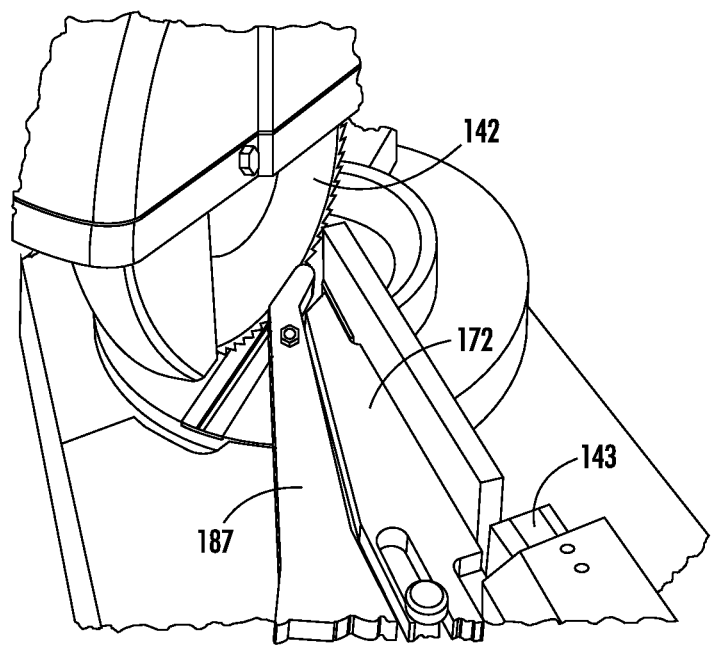
FIG. 7 is a second perspective view of the miter saw in and alternate cutting position.

Referring generally to FIGS. 6 and 7, for example, the disclosed embodiments provide an integrated securing mechanism for both positioning and securing a workpiece on a work surface, preferably one having a fence attached thereto. The positioning mechanism may include a multi-position sliding mount movable along a fence, such as that disclosed in U.S. Pat. No. 5,845,555, issued to Dawley. In the disclosed embodiments herein the securing member may be integrated with the sliding mount and pivotally connected to a cut-off stop to provide a force for capturing and securing the workpiece between the securing member and the fence.

In one embodiment described herein the profile of the first end of the securing member provides for a point of contact within about 0.01 inches of the blade and is angled so as to clear the blade path when making a miter cut up to at least 45-degrees. The force applied by the securing member is directed in a plane substantially perpendicular to the workpiece and generally against or "into" the fence. In this configuration the securing member is capable of opposing the cutting forces applied by the power tool to the workpiece. A compliant tip may also be added to the first end of the securing member to augment the "grip" and conform to the workpiece, absent of marring. This applied force is essential when working with short lengths for several reasons; (i) controlling or preventing movement of the workpiece against or along the fence during the cutting operation (e.g., chattering, can roughen the miter cut and produce inaccuracies); (ii) both the angular and radial force of the teeth on the blade introduce inaccuracies in the desired length; and (iii) once the cutting operation is complete a short cut-off piece that is not constrained, often re-engages the moving blade and may damage the piece or/and cause the piece to be propelled into the air, causing damage or personal injury.

Still another aspect of the various embodiments disclosed is a provision for an extension of the work surface and fence on either or both sides of a power miter saw. Such extensions may be employed with a power miter saw stand whereby the extensions, stand and saw are integrated into a cutting workstation to provide for the handling of stock on a worksite or in a shop environment. In accordance with one embodiment, there is provided an integrated workpiece stop and securing member that incorporates an angled workpiece securing member, a stop member and a movable clamping mechanism into a single apparatus that may be attached and positioned on a fence or directly to the work surface. In one embodiment, as seen in FIG. 1, the integrated workpiece holder includes a movable clamp 100 engaged to fence 143. Clamp 100 provides for a means to attach tools that enhance the utility of clamp 100 for the purpose of securing and indexing workpiece 112. The movable clamp assembly 100 is particularly versatile for mounting and locating a variety of jigs, fixtures and measuring tools. Accordingly, clamp assembly 100 includes one or more "T" shaped slots (T-slots) that can receive tools, such as the stop and securing assembly 200 illustrated in FIG. 1.

Although described in accordance with a clamp-type stop, it will be further appreciated that the present invention may include an integrated clamp or similar fixture that enables its connection to a range of fences or even directly to a work surface (e.g., horizontal table top (114)) or similar structure that will allow the tool to be repeatedly or removably attached to the extended fence and adjusted to locations necessary for holding and cutting off short workpieces. Stop screw 160 serves to accurately and consistently locate and index stop and securing assembly 200, relative to linear scale 145 found on fence 143. A predetermined offset must be subtracted from the indicia so as to compensate for the additional length of stop member 172. The offset is preferably based on a whole integer, for example 10 or 12 inches to facilitate the offset of the actual dimension of the cut-off relative to the distance between the saw blade and the extended stop 172. The offset may then be more finely tuned by the adjustment of accessory position screw 160 resting against stop screw 140.

Figure 3A:
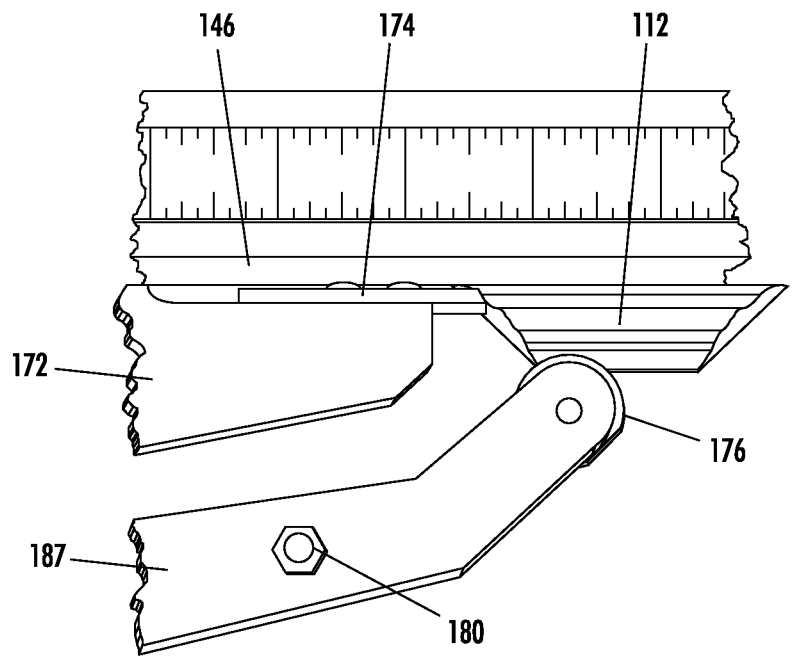
FIG. 3A is a partial top view of the securing and stop apparatus in a miter cut position.

Once clamp assembly 100 is accurately positioned for the desired length of cut, it is secured in place by locking mechanism 130, such as a cam or other quick-release locking mechanism, etc. Additionally, the end of stop member 172 may be adapted (e.g., having one or more of variously shaped stop ends) as illustrated in FIG. 3a to accommodate a bias profile of the workpiece. Stop end modifier 174 is positioned so the apex of the angled surface of the workpiece 112 in FIG. 3A is directly engaged with the beveled or chamfered edge 178 of stop end modifier 174. Accordingly, stop extension member 172 provides for extending the workpiece stop well within the miter saw cutting zone, in the case of relatively small cut-off dimensions—a particularly advantageous feature of the disclosed embodiment. The transverse motion of clamp 100 is constrained and limited to the length of the fence extension 143; accordingly the minimum workpiece stop was previously determined by the width of miter saw work surface 114, which is generally within the range of about 10 to 12 inches. Stop 172 will now position a workpiece down to at least 1. inch in length or possibly smaller, and yield a repeatable accuracy of at least about +/−0.016 inches.

It should be apparent that the present invention provides a workpiece stop extension assembly that is particularly versatile and easy to use. The workpiece stop and securing assembly 200 can be removed from the work surface and hung using storage hole 194, and then subsequently re-attached to clamp assembly 100 precisely at the correct position by placing stop screw 160 against stop 140, requiring no additional set-up. As previously noted an inherent problem with a short cut-off workpiece is the inability to safely hold the cut off piece up against fence 146 and stop 170, before, during and after the blade engages the workpiece. In accordance with the requirement to secure the short cut-off piece, securing member 187 is attached directly to stop extension member 172 using fastener 190 to provide a pinion and a pivot point for rotational movement of securing member 187 relative to stop extension member 172 and clamp assembly 100. A lock nut secures screw 190 and is adjusted to place a nominal pivotal frictional force on the pivot point of the securing member 187. As evident in FIG. 1, the workpiece contact point 165 must extend out beyond stop point 170 to secure the cut-off from workpiece 112, having blade 142 immediately to the right side, stop 170 on the left, fence 146 at the rear and now securing member 187 applying a force on the front side of the cut-off.

Interposed between securing member 187 and stop extension member 172 is connection plate 197 providing a slideable interface to stop member 172 and a pivotal connection point to securing member 187 as shown in FIG. 1. Hold down position screws 155 secures connection plate 197 to workpiece stop extension 172 within slot 168 having an opening length in the general range of about 1-3 inches. The motivation for using slot 168 is to position hold down contact point 165, as close to blade 142 as possible without contact, in order to mitigate the potential for a short workpiece to break free of the workpiece stop and securing assembly 200. Therefore slot 168 provides the ability to adjust the position of securing member 187 relative to the blade and stop member 172.

Attached to securing member 187 is the securing member handle 185. The functionality of this handle is two fold. First, the operator is compelled to place one hand on the miter saw switch/handle assembly (not shown) and the other on handle 185, thereby ensuring that both hands of the operator are free and clear of the blade before power is applied to saw motor 141. Safety interlock switch 182, which may be any suitable momentary normally open switch that is actuated while an operator grasps handle 185, is wired in series with the miter saw power so as the operator must activate both handle switch 182 and the primary saw switch before the miter saw motor is energized. Switch 182 is expected to comply with OSHA or similar safety standards for providing two-handed power lockout when operating hazardous machine tools. The intent of such a safety switch is to interlock the electrical power so that the saw motor can only be energized when both the operator's hands are a safe distance from the blade (one on the securing member and the other controlling a power switch on the saw handle).

The second function of handle 185, is to assist the operator in providing the required force to retain the short cut-off workpiece in position while the blade is cutting. In the case of a bias cut, or miter, the handle is mounted at a distal position of securing member 187 to ensure that the now angled saw blade is a safe distance from the operator's hand. Notably in this case fulcrum point 190 is located there between handle 185 and the blade set for a miter cut, therefore the operator must pull on handle 185 to secure the workpiece. In the case of a strait cut, handle 185 may be moved, or a handle added, so that it is mounted at inward position 186, located in between the blade and fulcrum point 190, and thereby requiring a pushing or inward force from the operator to secure the short workpiece in place.

Figure 2:
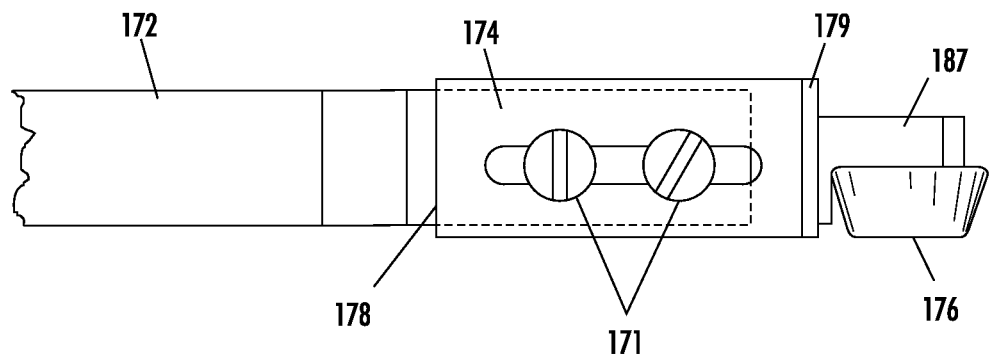
FIG. 2 is a side view of the securing and stop apparatus.
Figure 3B:
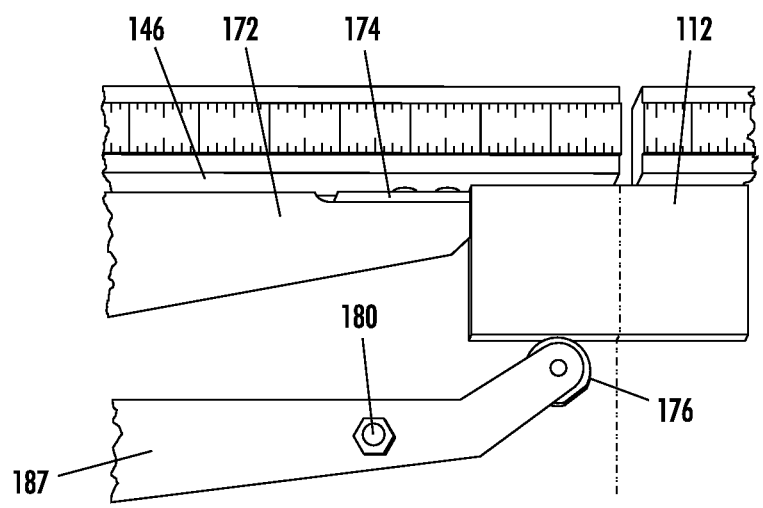
FIG. 3B is a partial top view of the securing and stop apparatus in a straight cut position.

Referring now to FIGS. 3A and 3B, there are shown two possible cutting options, a mitered cut as in FIG. 3A and a straight cut as seen in FIG. 3B. Securing member 187 has a securing tip portion angled at least 45 degree towards stop 170 to provide clearance for blade 142 (e.g., FIG. 6) when making an angle cut on a short workpiece. Additionally, as seen in FIG. 3A, stop tip 174, on stop extension member 172, includes beveled or chamfered edge 178 on one end and flush edge 179 on the opposite end. Fasteners 171, seen in FIG. 2, position stop tip 174 so beveled edge 178 is in contact with a workpiece having an angle cut. The bevel serves to conform to the angled end of the workpiece and thereby improve the accuracy of the cut line. Accordingly, on straight cuts stop tip 174 is either moved back flush with the stop extension member or turned end for end.

Also located in proximity to the distal end of member 187 is glide 180, which extends through the end of member 187 and facilitates a smooth frictionless motion of the securing member 187 when in contact with the work surface 114. Hold down compliant tip 176 is made from a relatively soft material (e.g., rubber, pliable polymer, etc.) to improve the effectiveness by increasing the securing friction between securing member 187 and workpiece 112. Additionally, compliant tip 176 serves as a sacrificial attachment to the end of securing member 187 and is constructed in such a manner so that any inadvertent contact with blade 142 will only serve to damage tip 176, thereby keeping the end of securing member 187 intact. Additionally, a damaged tip 176 is readily replaceable and is secured in position, for example, by an interference fit, threads, setscrew or any other similar restraining means.

Figure 4:
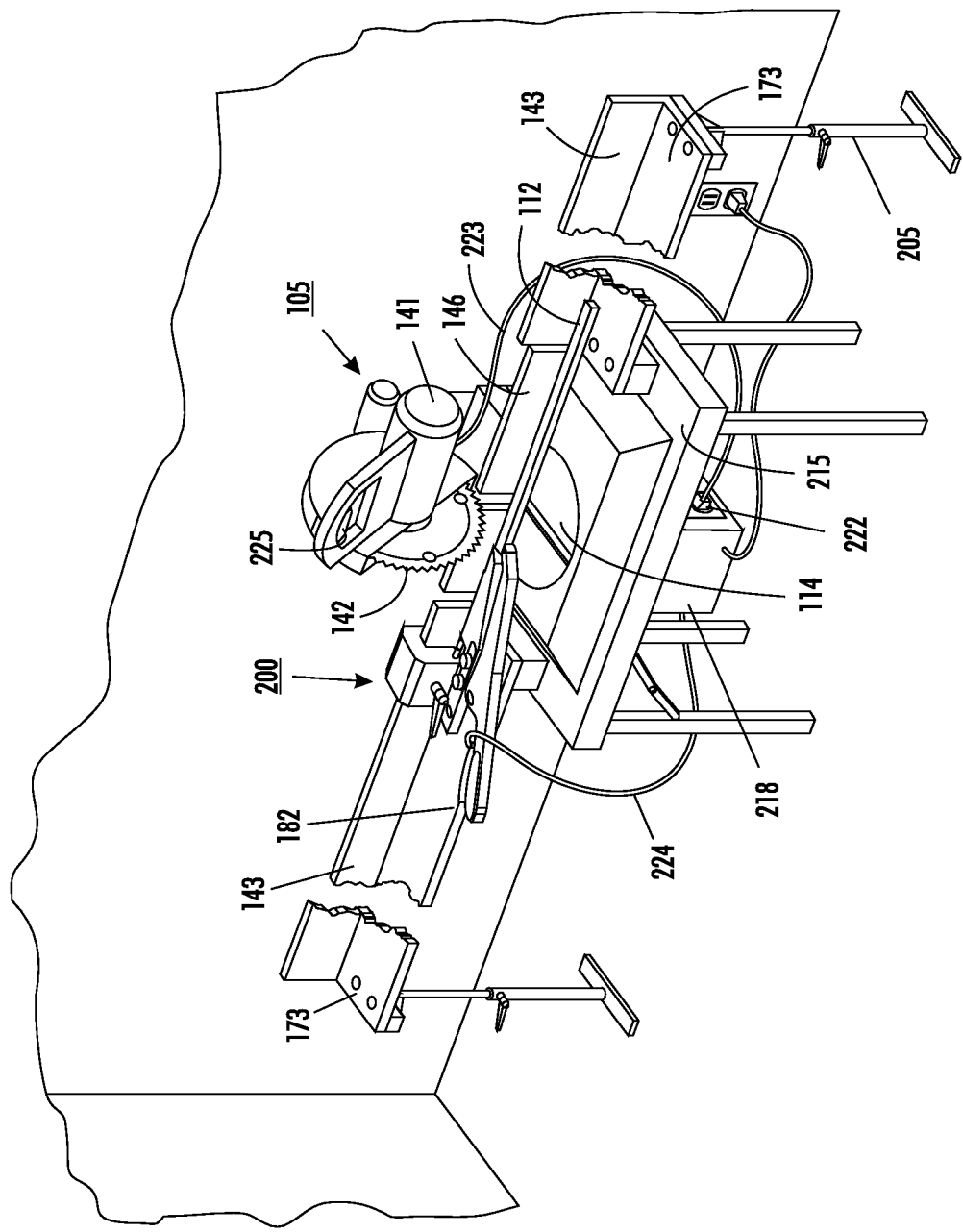
FIG. 4 is a perspective view of the securing and stop apparatus and work table extensions in a left side configuration.
Figure 5:
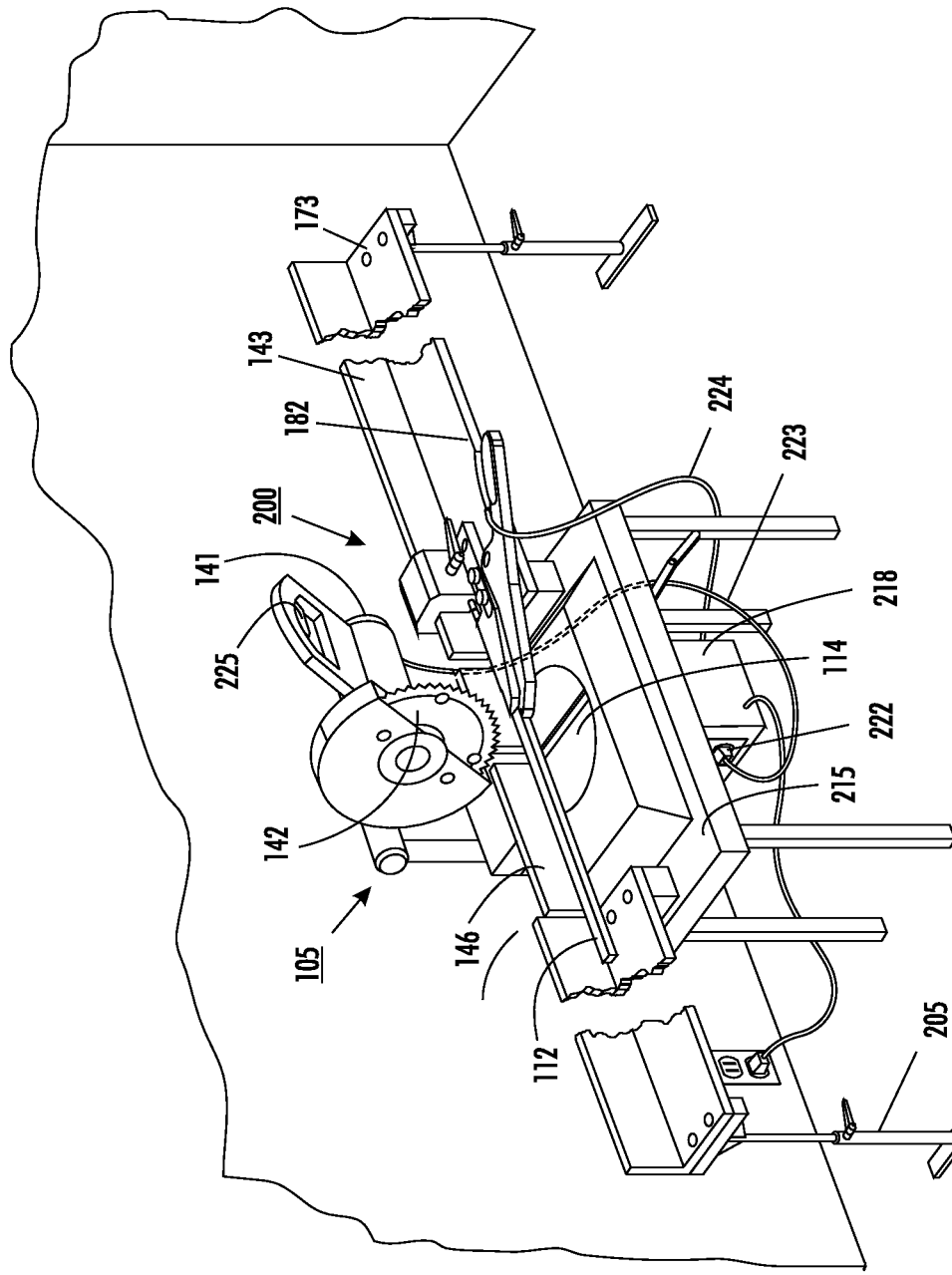
FIG. 5 is a perspective view of securing and stop apparatus and work table extensions in a right side configuration.

As previously discussed, and as depicted in FIG. 4, workpiece stop and securing assembly 200 may be operatively associated with movable clamp 100 that is suitable for setting and permitting repeatable indexing of stop member 172 to various lengths along work surface extension 173 and associated fence extension 143. One such device is the Glide-Stop™ manufactured and sold by J. A. Dawley. FIG. 4 illustrates an exemplary version of a fence/work surface having adjustable support leg 205. Notably the position of work surface extension may be transposed to permit the mounting of work surface extension 173 to the right and/or left side of miter saw 105, as depicted in FIG. 5. In the alternative, fence extension 143 may be moved to the opposite edge of work surface extension 173 and reattached thereby providing a single work surface extension for use on either the left or right side of miter saw 105.

As illustrated in FIG. 5, work surface extensions 173 may be subsequently appended to miter saw work table 215 using index pins or a similar connecting device. Miter saw work table 215 encompasses collapsible legs and is designed to accommodate "on-site" use of miter saw 105, either alone or in conjunction with, at least one work surface extension 173. Primary power is supplied to the miter saw 105 by plugging the power cord into saw power outlet 222 located within safety switch relay housing 218.

The power safety interlock switch embodiment, contained within housing 218, comprises a low voltage/current power transformer and a double pole, normally open relay, either solid state or mechanical, which transfers power to operate the saw. A relay coil (not shown), safety switch 182 and the low voltage power supply (not shown) are each connected in series to one another within relay box 218 so that when the power relay is energized 120 VAC is provided to outlet 222 where power cord 220 is plugged in. Once safety switch 182 is actuated, saw motor 141 will energize only when the trigger switch on the saw is pressed by the operator. Notably the operator is now substantially clear of blade 142 by virtue of securing member 187 and the required actuation of safety switch 182 incorporated within handle 185. Alternate switch types and positions for switch 182 are conceivable as long as the operator's hands are assured to be significantly clear of blade 142.

Referring now to FIGS. 4 and 5 where the present invention is depicted in an operational setting having saw 105 diagrammatically illustrated as having blade 142 and motor 141 mounted to an upper movable portion. Miter saw 105 rotates the blade in a manner conducive to cutting stock material as the operator moves the motor/saw assembly downward into the stationary workpiece 112. Fence 143 horizontally positions workpiece 112 relative to the blade 142. Saw 105 can be any type in which the saw is moved relative to the stationary workpiece 112, as is the case with a radial-arm saw. Work surface extensions 173 may be attached at either or both ends of miter saw work table 215 to provide a longer effective work surface for performing operations on a workpiece over 12 inches in length. Extensions 173 are connected to miter saw work table 215. Accordingly the entire cutting apparatus, including table 215, saw 105 and extension(s) 173 may be portable between work sites, however, they are also well suited to the stationary needs of a work shop environment.

Referring briefly to FIGS. 6 and 7, there are shown exemplary alternative embodiments, specifically showing an angle cut on a relatively short workpiece, wherein the movable clamp assembly 100 includes not only the stop extension and securing member, 172 and 187 respectively, but is operatively associated with the Glide-Stop™ device for providing accurate and repeatable linear indexing of stop and securing assembly 200 to various locations along work fence 143. As further illustrated, assembly 200 is affixed to the Glide-Stop™ indexing device as an accessory for cutting and securing relatively short cut-off pieces. In this manner, the present invention may be employed as an optional attachment for use with a Glide-Stop™ indexing mechanism or similar device that connects the holding apparatus to a work surface.

In recapitulation, the present invention is a method and apparatus for the improved safety and accuracy of miter saws by providing a means to reliably measure and secure a substantially short cut-off workpiece while the operator's hands are well removed from the cut zone. It is, therefore, apparent that there has been provided, in accordance with the present invention, a safe method and apparatus for measuring and securing a workpiece within a miter saw. While this invention has been described in conjunction with embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A safety apparatus for securely holding a workpiece, comprising:
    a work surface; and
    a securing member operable in cooperation with, and pivotally attached to, said work surface, said securing member securing the workpiece on said work surface and between the securing member and a stationary fence to hold the workpiece stationary relative to the work surface and the fence while the workpiece is operated on by a cutting tool moving relative to the stationary workpiece;
    a stop member for positioning the workpiece at a specified distance from a cutting tool wherein said stop member includes an adjustable end stop, said end stop having a flat edge and an opposing beveled edge, where in a first orientation the flat edge contacts a corresponding flat edge of the workpiece and in a second orientation the beveled edge contacts a corresponding angled edge of the workpiece; and
    a moveable mount having said stop and securing member attached thereto, and where the securing member pivots so as to move within a plane generally parallel to said work surface.

2. The apparatus of claim 1, wherein said securing member is adjustable to vary a distance by which the securing member extends beyond said stop member.

3. The apparatus of claim 1, further comprising a handle attached to said securing member, through which the force is applied by the user to hold the workpiece stationary.

4. The apparatus of claim 3, wherein said handle is attached to said securing member at a location generally between a pivot point and an end contacting the workpiece.

5. The apparatus of claim 3, wherein said handle is attached to said securing member at a location generally between a pivot point and a distal end of the securing member.

6. The apparatus of claim 3, further comprising an interlock switch to control, in conjunction with a cutting tool power switch, the power-on state of the cutting tool.

7. The apparatus of claim 1, wherein said securing member further comprises a compliant material attached at an end contacting the workpiece along a workpiece contact region of the securing member.

8. A workpiece stop and securing apparatus for positioning and securely holding a workpiece in relation to a saw blade, comprising:

an adjustable mount movably attached to a stationary fence, said stationary fence attached to a work surface for supporting the workpiece, and said adjustable mount including a stop member attached thereto in order to control a distance between the saw blade and the stop member, wherein said stop member further comprises an adjustable end stop, said end stop including an edge for contact with the workpiece to control the spatial relationship between the workpiece and the blade; and a workpiece securing member pivotally attached to said adjustable mount, for rotational movement in a plane generally parallel to the work surface, to thereby apply a holding force to a surface of the workpiece, in response to a force applied by a user in contact with the securing member, to hold said workpiece between the securing member and the stationary fence only while the force is applied, wherein a position of said workpiece securing member is also adjustable to enable a variation of a distance by which said securing member extends beyond an end of said stop member.

9. The workpiece stop and securing apparatus of claim 8, further including a handle attached to said securing member at a location generally between a pivot point and a distal end of the securing member.

10. The workpiece stop and securing apparatus of claim 8, further comprising a handle attached to the securing member between a pivot point and an end of the securing member in contact with the workpiece.

11. The workpiece stop and securing apparatus of claim 8, further comprising an interlock switch to control, in conjunction with a power switch, the operation of a motor to which the saw blade is operatively attached.

12. The workpiece stop and securing apparatus of claim 8, wherein said securing member further comprises a compliant material attached at an end contacting the workpiece along a workpiece contact region of the securing member.

\* \* \* \* \*